United States Patent Office 2,907,597
Patented Oct. 6, 1959

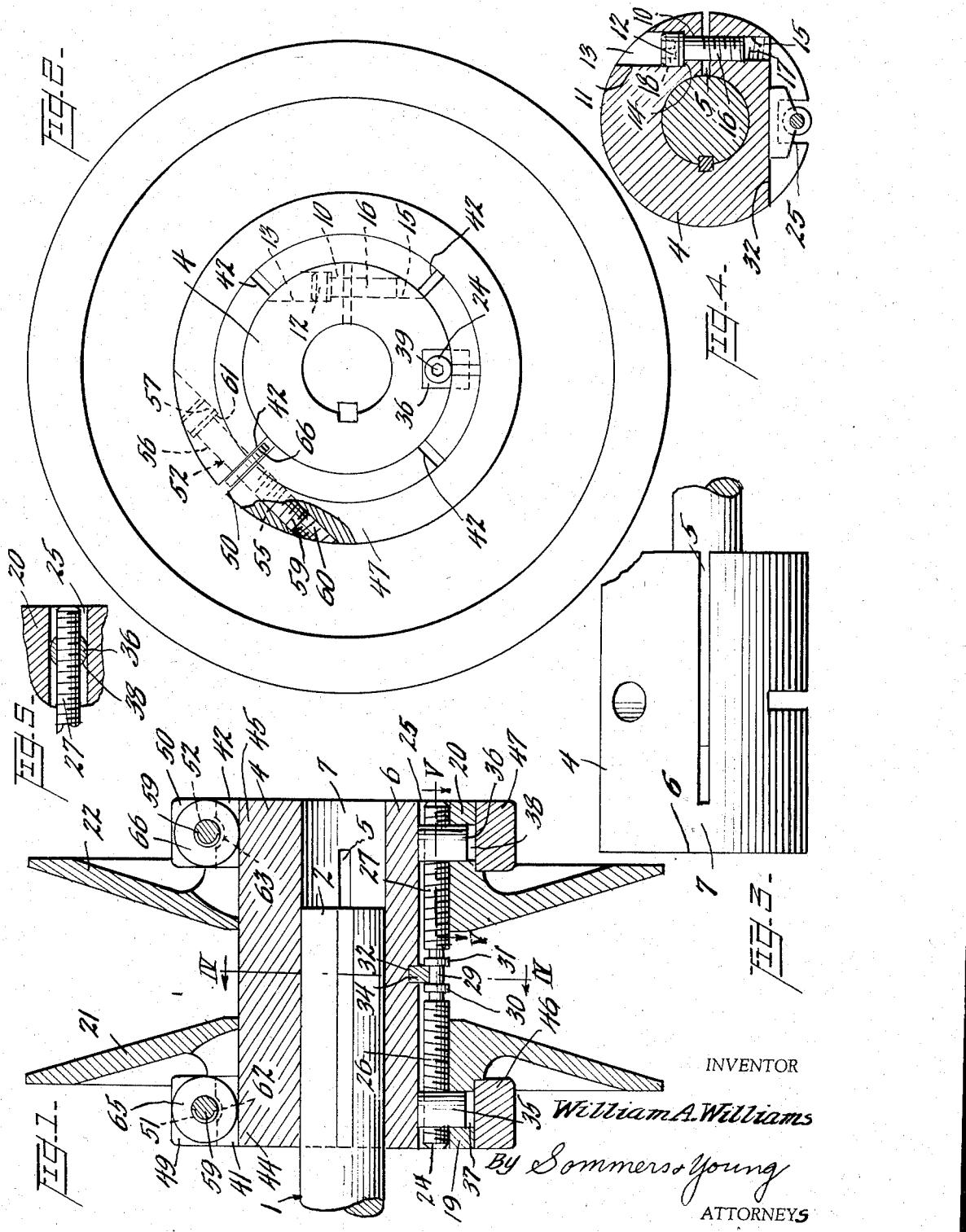

2,907,597

SHAFT CONNECTORS FOR POWER TRANSMISSION ELEMENTS

William A. Williams, Philadelphia, Pa., assignor to T. B. Wood's Sons Company, a corporation of Pennsylvania Application March 14, 1956, Serial No. 571,475

9 Claims. (Cl. 287—52.04)

This invention relates to shaft connectors for power transmission elements, such as, variable pitch and the like sheaves for transmission of power.

For a great many years the power transmission industry has been troubled with the tendency of sheaves, pulleys, gears, and sprockets and the like, provided with solid bore hubs toward "freezing" on their shafts. In such cases it was most difficult to remove them. As one means of avoiding this difficulty most manufacturers adopted tapered hubs as a means ensuring tight clamping on the shafts and easy removal therefrom. However, in some instances tapered hubs are not feasible. One such instance is variable pitch sheaves and thus other means must be provided to obtain a firm and secure mounting on the shaft and easy removal therefrom.

An object of this invention is to provide means for connecting the hub of a variable pitch sheave to a shaft in a secure manner, providing for ready removal while permitting the pitch of the sheave to be easily adjustable by axial movement of the flanges of the sheave.

A further object of this invention is to provide for the foregoing objects and at the same time to provide and maintain true centering of the sheave.

A still further object of this invention is to provide for the secure connection of the hubs of the flanges of a variable pitch sheave so as to relieve the adjustment means of load during operation.

Still another object of this invention is to provide for mounting a variable pitch sheave on a shaft by means of a split sleeve having clamping means for squeezing it upon the shaft and in which the flanges of the sheave have split hubs provided with clamping means which squeeze the hubs upon the said sleeve and serve as additional squeezing means for the sleeve, thereby attaining a particularly secure although simple mounting.

An embodiment of the invention is represented by way of example only, in the accompanying drawings in which:

Figure 1 is a longitudinal sectional view of a variable pitch sheave according to this invention, mounted by way of example on a shaft which may be driven by an electric motor.

Figure 2 is an end view of the sheave of Fig. 1.

Figure 3 is a side view of a split sleeve serving as an intermediate mounting between the sheave hubs and the shaft.

Figure 4 is a cross-sectional view of the sleeve shown in Fig. 3, taken on a section line IV—IV.

Figure 5 is a cross-sectional view on the line V—V of Fig. 1 on a larger scale.

In the drawing a variable pitch sheave is represented as being mounted on a shaft 1 which may for example, be the stub end portion 2 of an electric motor shaft, the motor not being shown in the drawing. Upon this end portion 2 is a sleeve 4 which is provided with a longitudinally extending radial split 5 extending a very substantial portion of its length but not its entire length, it being interrupted toward the outer end 6 of the sleeve by a solid portion 7. The split 5 has substantial width to permit compression of the sleeve. The sleeve 4 is slid onto the stub end portion 2 of shaft 1 with the split end thereof first, and is positioned with the solid end portion 7 of the sleeve overhanging the end of the shaft.

To provide for squeezing the sleeve onto shaft 1, the sleeve is provided on one side of said split 5, with a smooth bore 10 extending perpendicularly to the radial direction of split 5 and opening at one end through the outer face of the sleeve 4 and at its other end into said split 5. The outer end of said bore is enlarged as indicated at 11 providing a recess 13 for a cap screw head 12 and an abutment face 14 against which head 12 may press. The cap screw head may be provided with an angular recess 18 in its free end for insertion of an operation tool or wrench. The sleeve is also provided with a screw-threaded bore 15 in the portion thereof on the opposite side of said split, and arranged in extension of said smooth bore 10. This arrangement is provided with a cap screw 16 extending freely through smooth bore 10 into threaded bore 15 engaging the threads 17 thereof, whereby when the cap screw is tightened the sleeve 4 is flexed inwardly and squeezed tightly into gripping engagement with the shaft 1. When in assembled condition the bolt head 12 is completely contained within recess 13 and does not protrude outwardly beyond the cylindrical outer surface of sleeve 4. Although the above described sleeve-squeezing means serves to provide gripping of the sleeve on the shaft for drive transmitting purposes, one of its additional and important purposes is to maintain the sheave centered at all times including during the carrying out of adjustments of the sheave for change of speed, and thus also providing for continued alignment of the belt, making it unnecessary for the operator to check the alignment after each adjustment.

The split sleeve 4 serves as a mounting for the hubs 19 and 20 of conical sheave flanges 21, 22, respectively. The flanges 21, 22 are adjustable to and from each other along the sleeve 4 to alter the drive ratio of the sheave. It is desirable that this adjustment be simultaneous, and equal with respect to a central plane extending transversely of the axis of the shaft 1 approximately midway of the length of sleeve 4, and for effecting this adjustment an adjusting screw 24 and cooperating elements are provided. Adjustment screw 24 is accommodated with a groove 25 in the outer face of sleeve 4, and extending longitudinally thereof. The two end portions 26 and 27 of screw 24 are provided with screw threads of equal pitch and opposite hand, and at the middle portion 29 the threads are omitted and a pair of abutment shoulders 30, 31 are provided in spaced relation. At the middle portion of sleeve 4 a transverse slot 32 is provided at such a position as to intersect groove 25. A centering key 34 is seated and prevented from moving longitudinally of the sleeve, and this key is engaged on its opposite sides by shoulders 30, 31. The threaded end portions 26, 27 of adjusting screw 24 engage in the openings of cylindrical nuts 35, 36 respectively, partially accommodated rotatably and slidably in bores 37, 38, respectively, extending radially in the hubs 19, 20 of the sheave flanges, the portions of said nuts containing the threaded bores being located inwardly of the hubs in groove 25 in alignment with and engaged by adjusting screw 24. One end of screw 24 is provided with an angular recess 39 for engagement with a wrench for turning said screw for adjusting the pitch of the sheave.

Each of the hubs 19 and 20 of the sheave flanges is provided with a plurality of longitudinal slits 41, 42. These slits are of substantial breadth and allow the hubs to be compressed upon the outer surface of sleeve 4. These slits extend from the outer ends of the hubs approximately to the respective flanges.

Mounted on the outer or remote end portions 44, 45, of the hubs are locking collars 46, 47, respectively. Each of these collars is split or interrupted at one point by a gap 49, 50, respectively, and at the positions of said gaps, transversely extending bores 51, 52 are provided extending perpendicular to and intersecting the walls of said gaps. The portions 55 of said bores on one side of said gaps are screw-threaded while the portions 56 on the other sides are smooth and slightly larger than the screw-threaded portions. At their end portions remote from the gaps the smooth portions 56 of said bores are enlarged so as to accommodate the heads 57 of cap screws 59 which are freely inserted through the smooth bores 56 and screw-threadedly engaged with the threads 60 of the screw-threaded portions 55. These enlargements also provide shoulders 61 against which the cap screw heads 57 bear. The cap screw heads may be of the type provided with angular recesses for operation by a suitable tool. In order to accommodate the bolt cap screws without interference the hubs 19 and 20 of the flanges may be grooved as indicated at 62, 63, respectively. For ensuring that the collars and hubs will remain in properly cooperating angular position considered relative to the axis of the shaft washers 65, 66 are inserted in the slits 49, 50 of the collars 46, 47, and extend inwardly into one of the slits 41, 42 in the hubs which are located at the centers of grooves 62, 63 respectively.

When the flanges 21, 22 of the sheave have been adjusted along the sleeve 4 to the desired spacing to provide the drive ratio wanted, the cap screws are turned down, that is, tightened until the collars are drawn together at the slit and compressed so as to compress the slit hubs of the sheave flanges against sleeve 4 so as to provide a very secure driving connection therebetween. The pressure provided by the compressing of these collars is further transmitted through the hubs to the split sleeve 4 and is added to the force provided by cap screws 16 tending to squeeze sleeve 4 into firm gripping engagement with the end portion 2 of shaft 1. Thus double use is made of a considerable part of the force provided by cap screws 59 for securing firmer and surer engagement between the sleeve 4 and the shaft on which it is mounted.

Although the split sleeve 4 is provided with screw means 15, 16 for reducing its diameter and squeezing it into frictional engagement with the shaft 1, which increases its drive-transmitting grip on the shaft, the principal advantage of the presence of said squeezing means is that the engagement of the sleeve on the shaft is maintained when the hubs of the sheaves are loosened. Thus, when the hubs are loosened for the purpose of adjusting the pitch of sheave the sheave is maintained centered by the sleeve and it is therefore unnecessary for the operator to check and correct the alignment of the belt after each adjustment of the driving speed.

I claim:

1. In mechanism for drivingly connecting a power transmission element to a rotary shaft, a sleeve having a longitudinally extending split of substantial angular width, extending from one end thereof, said sleeve being mounted on said shaft, said transmission element having a hub provided with a split of substantial angular width extending longitudinally, said hub being mounted radially on said sleeve outwardly of the split in said sleeve, and means for squeezing said hub upon said sleeve to frictionally grip said sleeve and to squeeze said sleeve upon said shaft to provide for frictional grip of said hub on said sleeve and of said sleeve on said shaft.

2. Mechanism for drivingly connecting a power transmission element on a rotary shaft according to claim 1, and in which additional means is provided for squeezing said sleeve to a smaller diameter to increase the frictional grip of said sleeve on said shaft and to maintain the position of said sleeve on said shaft whenever said first-mentioned squeezing means is loosened for the purpose of adjusting said transmission element.

3. Mechanism for connecting a power transmission element on a rotary shaft according to claim 2, and in which said additional sleeve squeezing means comprises a bore in said sleeve extending across said split in said sleeve and having screw thread in the portion thereof on one side of said split and a cap screw extending through said bore and engaging with said threads.

4. Mechanism for connecting a power transmission element on a rotary shaft according to claim 1, and in which said split in said sleeve extends a substantial part of the sleeve but less than its entire length.

5. Mechanism for connecting a power transmission element on a rotary shaft according to claim 1, and in which said hub squeezing means comprises a collar extending around said hub and having a gap therein, said collar having a bore extending across said gap and having screw threads in the portion thereof on one side of said gap, and a cap screw extending through said bore and engaging with said threads.

6. Mechanism for connecting a power transmission element on a rotary shaft according to claim 1, and in which an additional similarly split hub is provided on said sleeve, said hubs each being provided with conical flanges, said flanges being arranged to face in opposite directions with their smaller portions closer to each other so as to constitute the flanges of a variable pitch sheave, said additional split hub also being provided with hub squeezing means whereby said two hub squeezing means are releasable to allow relative movement of said hubs and flanges to change the pitch of the sheave, and to allow tightening of said squeezing means to secure said hubs and flanges in the new positions of adjustment.

7. Mechanism for connecting a power transmission element on a rotary shaft according to claim 1, and in which said split in said sleeve extends a substantial part of the length of said sleeve but less than its entire length, said sleeve being mounted on said shaft with the shaft extending within the split portion of said sleeve but terminating short of the part of the sleeve longitudinally beyond its split part.

8. In mechanism for drivingly connecting a power transmission element to a rotary shaft, a sleeve having a split extending therethrough of substantial angular width, said split extending longitudinally of said sleeve from one end thereof a substantial portion of the length of said sleeve but terminating short of the opposite end of said sleeve, said transmission element being mounted on the split portion of said sleeve, said element having a hub extending around said sleeve, said hub having a longitudinally extending split therein of substantial angular width, and means exerting a releasable clamping force on said split hub to squeeze said hub on said split portion of said sleeve whereby the combined clamping forces of said sleeve clamping means and said hub clamping means is exerted on said sleeve to clamp it tightly on said shaft.

9. In mechanism for drivingly connecting a power transmission element to a rotary shaft, a sleeve having a split extending therethrough of substantial angular width, said split extending longitudinally of said sleeve from one end thereof a substantial portion of the length of said sleeve but terminating short of the opposite end of said sleeve, a clamping member extending across said split and engaging said sleeve on the opposite sides thereof for exerting a releasable clamp force on the split portion of said sleeve when tightened, said transmission element being mounted on the split portion of said sleeve, said element having a hub extending around said sleeve, said hub having a longitudinally extending split therein of substantial angular width, and means exerting a releasable clamping force on said split hub to squeeze said hub on said split portion of said sleeve whereby the combined clamping forces of said sleeve clamping means and said hub clamping means is exerted on said sleeve to clamp it tightly on said shaft.

References Cited in the file of this patent

UNITED STATES PATENTS

| | | |
|---|---|---|
| 1,436,032 | Greer | Nov. 21, 1922 |
| 1,521,823 | Martins | Jan. 6, 1925 |
| 2,062,629 | Zimic | Dec. 1, 1936 |
| 2,447,958 | Mueller | Aug. 24, 1948 |